United States Patent
Yokota

[11] Patent Number: 6,033,558
[45] Date of Patent: Mar. 7, 2000

[54] SELF-GUSH-CLEANING FILTER DEVICE

[75] Inventor: Hiroshi Yokota, Hiroshima, Japan

[73] Assignees: Kabushiki Kaisha Yokota Seisakusho, Hiroshima; Hiroshi Yokota, Hiroshima, both of Japan

[21] Appl. No.: 09/000,424

[22] PCT Filed: Jun. 20, 1996

[86] PCT No.: PCT/JP96/01724

§ 371 Date: Feb. 3, 1998

§ 102(e) Date: Feb. 3, 1998

[87] PCT Pub. No.: WO97/05939

PCT Pub. Date: Feb. 20, 1997

[30] Foreign Application Priority Data

Aug. 4, 1995 [JP] Japan ...................................... 7-199388

[51] Int. Cl.[7] ........................... B01D 29/64; B01D 29/66; B01D 29/70
[52] U.S. Cl. .......................... 210/108; 210/107; 210/354; 210/408; 210/411
[58] Field of Search ................................. 210/86, 87, 88, 210/90, 104, 106, 108, 137, 357, 384, 388, 389, 390, 391, 393, 396, 397, 408, 411, 413, 414, 429, 107; 209/269, 365.2, 381

[56] References Cited

U.S. PATENT DOCUMENTS

| | | |
|---|---|---|
| 1,340,599 | 5/1920 | Clarke . |
| 2,024,753 | 12/1935 | Zwicky . |
| 3,767,049 | 10/1973 | Worlidge . |
| 5,364,539 | 11/1994 | Castagno et al. . |
| 5,642,752 | 7/1997 | Yokota et al. . |
| 5,713,556 | 2/1998 | Yokota et al. . |
| 5,735,308 | 4/1998 | Yokota et al. . |

FOREIGN PATENT DOCUMENTS

| | | |
|---|---|---|
| 52-26827 | 7/1977 | Japan . |
| S52-26827 | 7/1977 | Japan . |
| 1340797A1 | 9/1987 | Russian Federation . |

*Primary Examiner*—W. L. Walker
*Assistant Examiner*—Als Schwartz
*Attorney, Agent, or Firm*—Ladas & Parry

[57] ABSTRACT

A self-gush-cleaning filter device comprises a filter casing (1) provided with an inlet passage (a) and an outlet passage (d), a screen (11) disposed within the filter casing (1) so as to slide along the inner surface of the filter casing (1) in the flowing direction of a fluid, a foreign matter ejecting opening (15) being formed between the screen (11) and the inlet passage (a). A drive shaft (4) for driving the screen (11), a screen driving unit (3) for driving the drive shaft (4) so as to move the screen (11) quickly in a downstream direction in which the fluid flows from the inlet passage (a) toward the outlet passage (d) and to move the screen slowly in an upstream direction. An outlet shutoff valve (14) is disposed in the outlet passage (d) of the filter casing (1). The screen driving unit (3) is actuated after closing the outlet shutoff valve (14) to move the screen (11). When the screen (11) is moved quickly in the downstream direction, the fluid gushes from the downstream side through the screen (11) into the upstream side, and the foreign matters deposited on the screen (11) are removed from the screen (11) by the force of the gushing fluid.

12 Claims, 5 Drawing Sheets

SELF-GUSH-CLEANING FILTER DEVICE

TECHNICAL FIELD

The present invention relates to a filter device to be placed in a fluid inlet or a fluid conduit to remove dust and foreign matters contained in a fluid conducted through the fluid conduit. More particularly, the present invention relates to a self-gush-cleaning filter device provided with a filter screen and having a function to remove rationally dust and foreign matters deposited on the filter screen.

In this specification, the term, "fluid" is used as a general term signifying a liquid or a gas, and the term "foreign matters" is used as a general term signifying matters such as gravel, algae, slurries, grains or fragments of a substance when the fluid represents a liquid or signifying matters such as dust particles, particulate maters or fragments of a substance when the fluid represents a gas.

BACKGROUND ART

Prevalently used conventional filter devices are classified by filtering means into those of a screen type provided with, for example, a metal screen, a perforated panel or a slit panel, those of a cyclone type and those of a centrifugal separation type, and are classified by cleaning system into those of a shaking system, those of a scraping system and those of a backwash system.

The most serious problem in the conventional filter devices is a method of discharging foreign matters deposited on the screen to prevent the clogging of the screen with foreign matters. Although various filter devices of a shaking system, a scraping system and a backwash system have been proposed, those prior art filter devices need a discharge means of a large scale greater than that of their screening devices and require a high manufacturing cost, and the cleaning systems of those prior art filter devices are short of a perfect cleaning means.

It is an object of the present invention to provide a high-performance, economically advantageous filter device of a simple, rational construction, capable of drastically solving technical problems residing in the prior art, easy to design and manufacture, capable of easily removing foreign matters deposited on a screen and discharging the foreign matters removed from the screen by either manual operation or automatic operation using actuators, and capable of being constructed in a large scale without entailing any problem.

DISCLOSURE OF THE INVENTION

With the foregoing object in view, the present invention provides a self-gush-cleaning filter device comprising, as principal components, a filter casing provided with an inlet passage and an outlet passage, a screen disposed within the filter casing so as to slide along the inner surface of the filter casing in the flowing direction of a fluid, a foreign matter ejecting opening formed between the screen and the inlet passage, a drive shaft for driving the screen, a screen driving unit for driving the drive shaft so as to move the screen quickly in a downstream direction in which the fluid flows from the inlet passage toward the outlet passage and to move the same slowly in an upstream direction opposite the downstream direction, and an outlet shutoff valve disposed in the outlet passage of the filter casing.

When removing foreign matters deposited on the screen from this self-gush-cleaning filter device of the present invention, the outlet shutoff valve is closed to disconnect the screen from a downstream passage to form a closed chamber filled up with the fluid between the screen and the outlet shutoff valve. Then, the screen driving unit is actuated to move the screen slowly in the upstream direction and to move the screen quickly in the downstream direction. The fluid flows through the screen into the closed chamber from the upstream side of the screen toward the downstream side of the same while the screen is being moved gradually in the upstream direction. When the screen is moved quickly in the downstream direction, the fluid contained in the closed chamber gushes suddenly from the downstream side of the screen through the screen into the upstream side of the same, so that foreign matters deposited on a surface of the screen on the upstream side are blown off the screen by the force of the gushing fluid. The foreign matter ejecting opening is opened to take out the foreign matters thus removed from the screen.

The screen driving unit may comprise a wiper cam mechanism for pushing the drive shaft in the upstream direction, and a biasing member for biasing the drive shaft in the downstream direction.

The screen driving unit may comprise a wiper cam mechanism for pushing the drive shaft in the upstream direction, a piston mounted on the drive shaft, and a cylinder hermetically receiving the piston therein, and having a chamber for pushing the drive shaft in the downstream direction communicating with the inlet passage, and a chamber for pushing the drive shaft in the upstream direction communicating with the atmosphere.

The screen driving unit may comprise a biasing member for biasing the drive shaft in the upstream direction, a piston mounted on the drive shaft, and a cylinder loosely receiving the piston therein, and having a chamber for pushing the drive shaft in the downstream direction, communicating with a space on the downstream side of an inlet shutoff valve disposed in the inlet passage, and a chamber for pushing the drive shaft in the upstream direction, communicating with a space on the downstream side of the outlet shutoff valve.

A scraping member may be disposed in sliding contact with a surface of the screen on the upstream side or the downstream side of the screen, or scraping members may be disposed in sliding contact with surfaces of the screen on the upstream side and the downstream side of the screen, respectively.

Any or all of the screen driving unit, the outlet shutoff valve, the inlet shutoff valve and the foreign matter ejecting opening may be operated automatically by an actuator or actuators.

The automatic operations of the actuators may be started on the basis of a positional signal representing a position of the screen or on the basis of a differential pressure signal representing a differential pressure between the upstream side of the screen and the downstream side of the same, and may be carried out in predetermined sequence.

BEST MODE FOR CARRYING OUT THE INVENTION

Preferred embodiments of the present invention will be described hereafter with reference to the accompanying drawings.

Figure 1:
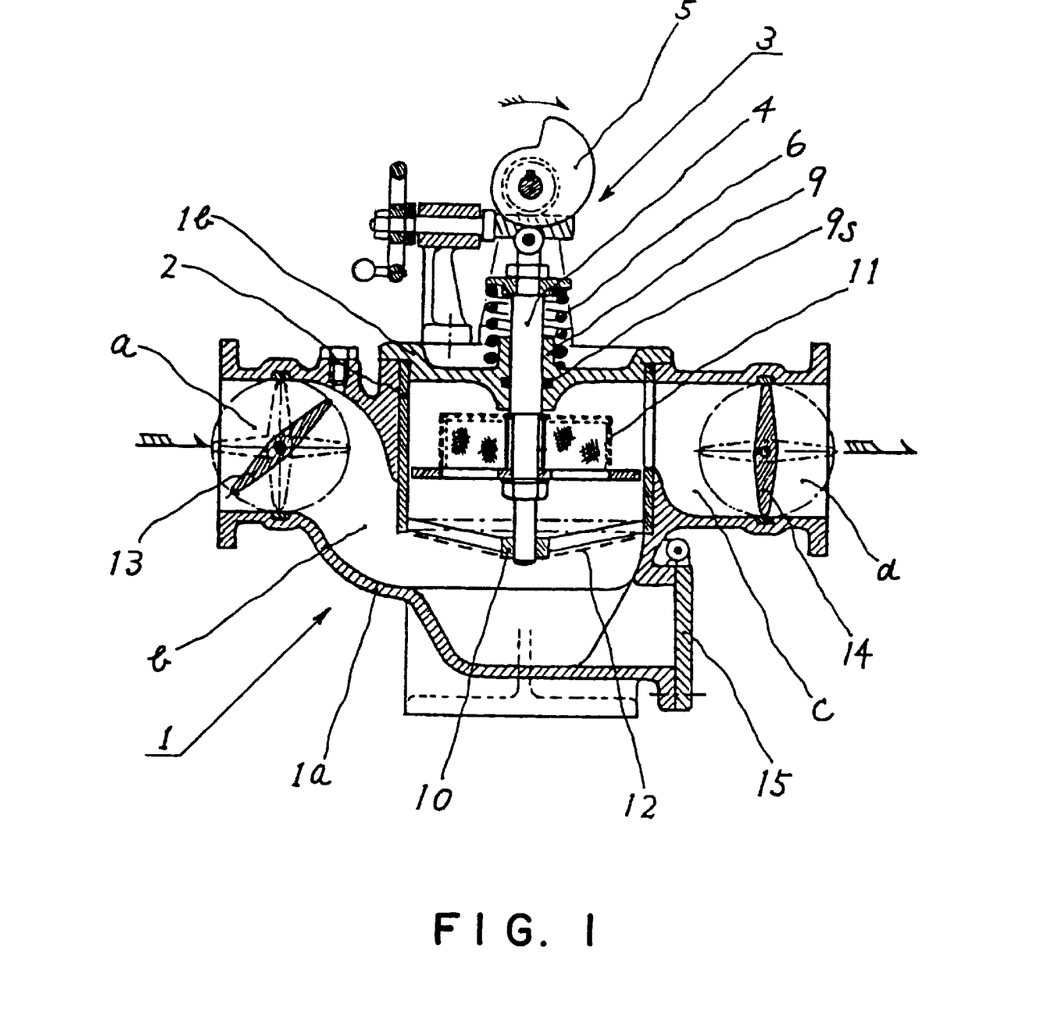
FIG. 1 is a longitudinal sectional view of a self-gush-cleaning filter device in a first embodiment according to the present invention in a state where a screen has been moved to a limit downstream position.

Referring to FIG. 1 showing a self-gush-cleaning filter device in a first embodiment according to the present invention, a filter casing 1 is constructed by placing an inlet shutoff valve 13 in an inlet passage a formed in a filter body 1a provided with a foreign matter ejecting opening 15, placing an outlet shutoff valve 14 in an outlet passage d formed in the filter body 1a and putting a lid 1b on the filter body 1a. A cylindrical partition member 2 opening into the inlet passage a and the outlet passage d is fitted in a vertical attitude within the filter casing 1. A screen 11 is fitted in the partition member 2 so as to be vertically movable along the inner circumference of the partition member 2. The screen 11 has a central portion fastened to a drive shaft 4 for driving the screen 11, supported in bearings 9 and 10, and hermetically extending through a sealing member 9s fitted in the lid 1b. The drive shaft 4 is connected to a screen driving unit 3.

The screen driving unit 3 moves the screen 11 quickly in a downstream direction, i.e., the flowing direction of a fluid flowing from the inlet passage a toward the outlet passage d and moves the same slowly in an upstream direction, i.e., a direction opposite the flowing direction of the fluid. The screen driving unit 3 comprises a biasing member 6, such as a coil spring, continuously biasing the drive shaft 4 in the downstream direction, and a wiper cam mechanism combined with the drive shaft 4. When a handle included in this wiper cam mechanism is turned by hand, a wiper cam 5 is driven for turning by a torque applied thereto through a reduction mechanism, and the wiper cam 5 pushes the drive shaft 4 axially in the upstream direction. The wiper cam 5 has a shape resembling, for example, a scroll.

In a state where the outlet shutoff valve 14 has been closed, the drive shaft 4 is continuously biased in the downstream direction by the biasing member 6. When the handle is turned to turn the wiper cam 5 clockwise as viewed in FIG. 1, the wiper cam 5 pushes the drive shaft 4 gradually in the upstream direction against the biasing force of the biasing member 6. Upon the passage of the nose of the wiper cam 5 past the drive shaft 4, the lift of the wiper cam 5 changes suddenly from a maximum lift to a minimum lift, so that the drive shaft 4 is moved quickly in the downstream direction.

The operation of the self-gush-cleaning filter device thus constructed will be described below.

The fluid is filtered as the same flows from the inlet passage a through passages b and c toward the outlet passage d and foreign matters separated from the fluid deposits on the upstream surface of the screen 11. When ejecting the foreign matter deposited on the screen 11, the outlet shutoff valve 14 is closed first to disconnect the self-gush-cleaning filter device from a downstream passage connected thereto.

Consequently, a closed chamber filled up with the fluid is formed between the screen 11, i.e., a wall having a moderate sealing property, and the outlet shutoff valve 14, i.e., a wall having a strict sealing property. The inlet shutoff valve 13 may be either opened or closed.

Then, the screen driving unit 3 is operated to move the screen 11 slowly in the upstream direction and to move the same quickly in the downstream direction. While the screen 11 is being moved slowly in the upstream direction and the volume of the closed chamber is gradually increasing, the fluid flows from the upstream side of the screen 11 through the screen 11 into the closed chamber on the downstream side of the screen 11. When the moving direction of the screen 11 is changed thereafter, the screen 11 moves quickly in the downstream direction. Consequently, the fluid gushes from the closed chamber on the downstream side of the screen 11 through the screen 11 into the space on the upstream side of the screen 11, and the foreign matters deposited on the upstream surface of the screen 11 are blown off the screen 11 by the force of the gushing fluid.

This screen driving cycle, in which the screen 11 is moved slowly in the upstream direction and then moved quickly in the downstream direction, may be appropriately repeated. If scraping members, not shown, such as brushes, are placed in sliding contact with the surface/surfaces of the screen 11 on the upstream and/or the downstream side, the scraping members are operated to promote the foreign matter removing action of the gushing fluid. The scraping member in sliding contact with the surface of the screen 11 on the upstream side scrapes the foreign matters off the screen 11 and the scraping member in sliding contact with the surface of the screen 11 on the downstream side pushes the foreign matters through the meshes of the screen 11 toward the upstream side.

The foreign matter ejecting opening 15 is opened at suitable times to eject the foreign matters thus separated from the surface of the screen 11 on the upstream side and deposited on the bottom of the filter casing 1. If the inlet shutoff valve 13 is kept closed during the ejection of the foreign matters, the foreign matters are ejected together with a volume of the fluid equal to that of a space between the inlet shutoff valve 13 and the outlet shutoff valve 14. If the inlet shutoff valve 13 is kept open during the ejection of the foreign matters, the foreign matters are flushed away by the fluid that flows into the self-gush-cleaning filter device at the pressure of the inlet passage a. Naturally, the force of the fluid which flushes away the foreign matters can be adjusted by adjusting the opening of the inlet shutoff valve 13.

The foreign matter ejecting opening 15 is closed and the inlet shutoff valve 13 and the outlet shutoff valve 14 are opened after the completion of the ejection of the foreign matters to return the self-gush-cleaning filter device to its filtering work.

Thus, the present invention solves drastically and economically the foregoing problems which could not have been solved by the prior art.

Figure 2:
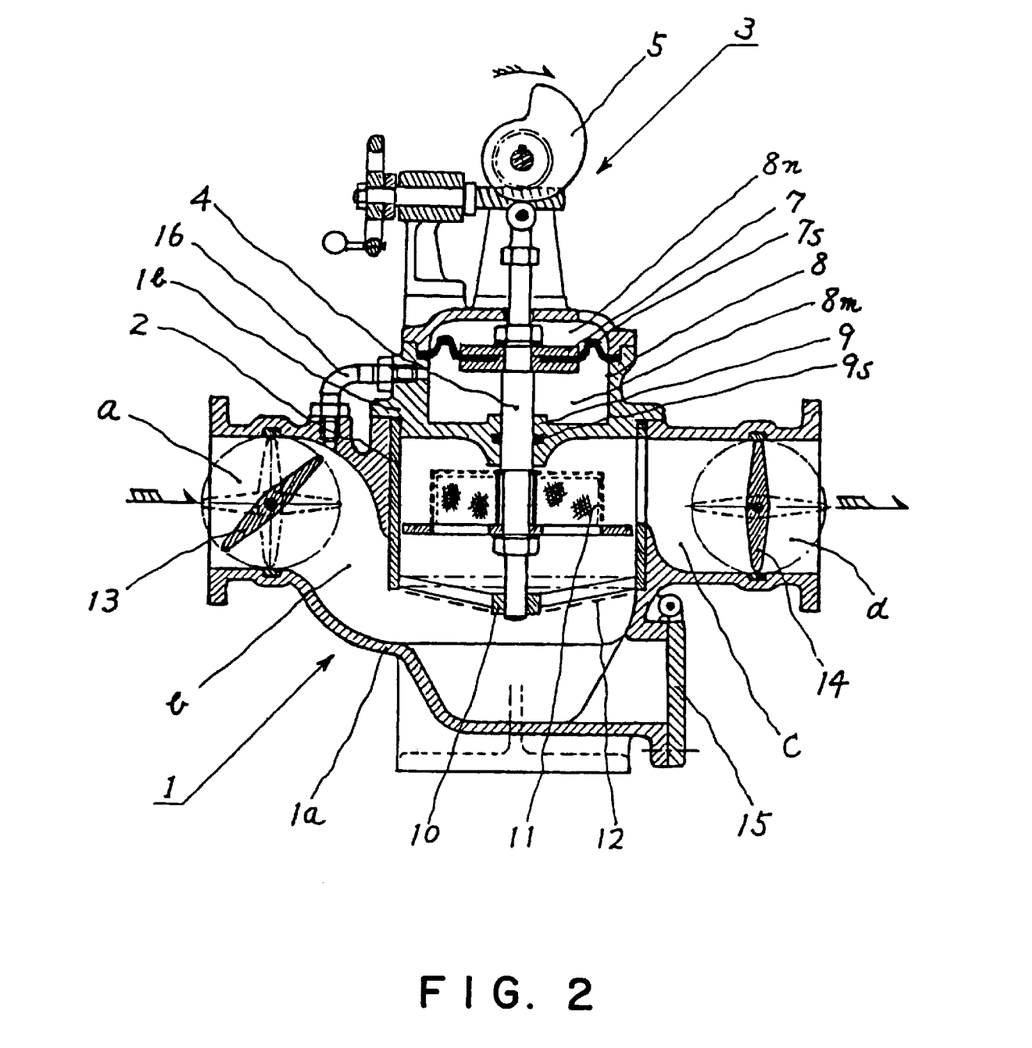
FIG. 2 is a longitudinal sectional view of a self-gush-cleaning filter device in a second embodiment according to the present invention in a state where a screen has been moved to a limit downstream position.

FIG. 2 shows a self-gush-cleaning filter device in a second embodiment according to the present invention. The self-gush-cleaning filter device in the second embodiment is obtained by replacing the biasing member 6 biasing the drive shaft 4 in the downstream direction of the screen driving unit 3 employed in the first embodiment with a cylinder actuator comprising a piston 7 and a cylinder 8. A screen driving unit 3 employed in the second embodiment comprises a wiper cam mechanism, the piston 7 mounted on a drive shaft 4 for driving a screen 11, the cylinder 8 in which the piston 7 is fitted, and a sealing member 7s disposed for sealing between the piston 7 and the cylinder 8. The wiper cam mechanism is similar to that employed in the first embodiment, and hence the description thereof will be omitted. The piston 7 divides the inner space of the cylinder 8 into a chamber 8m and a chamber 8n. The chamber 8m, which is used for moving the drive shaft 4 in the downstream direction, is connected to an inlet passage a by a connecting passage 16, and the chamber 8n, which is used for moving the drive shaft 4 in the upstream direction, is opened into the atmosphere. The pressure in the chamber 8m, i.e., the pressure of the fluid in the inlet passage a, always exceeding the pressure in the chamber 8n, i.e., the atmospheric pressure, biases the drive shaft 4 always in the downstream direction, so that the same function of the biasing member 6 shown in FIG. 1 is obtained. Other particulars of the operating mode of the self-gush-cleaning filter device are the same as those of the operating mode of the self-gush-cleaning filter device shown in FIG. 1 and hence the description thereof will be omitted.

The chamber 8n may be connected to a negative pressure source, not shown, instead of being opened into the atmosphere to enhance the biasing effect.

Figure 3:
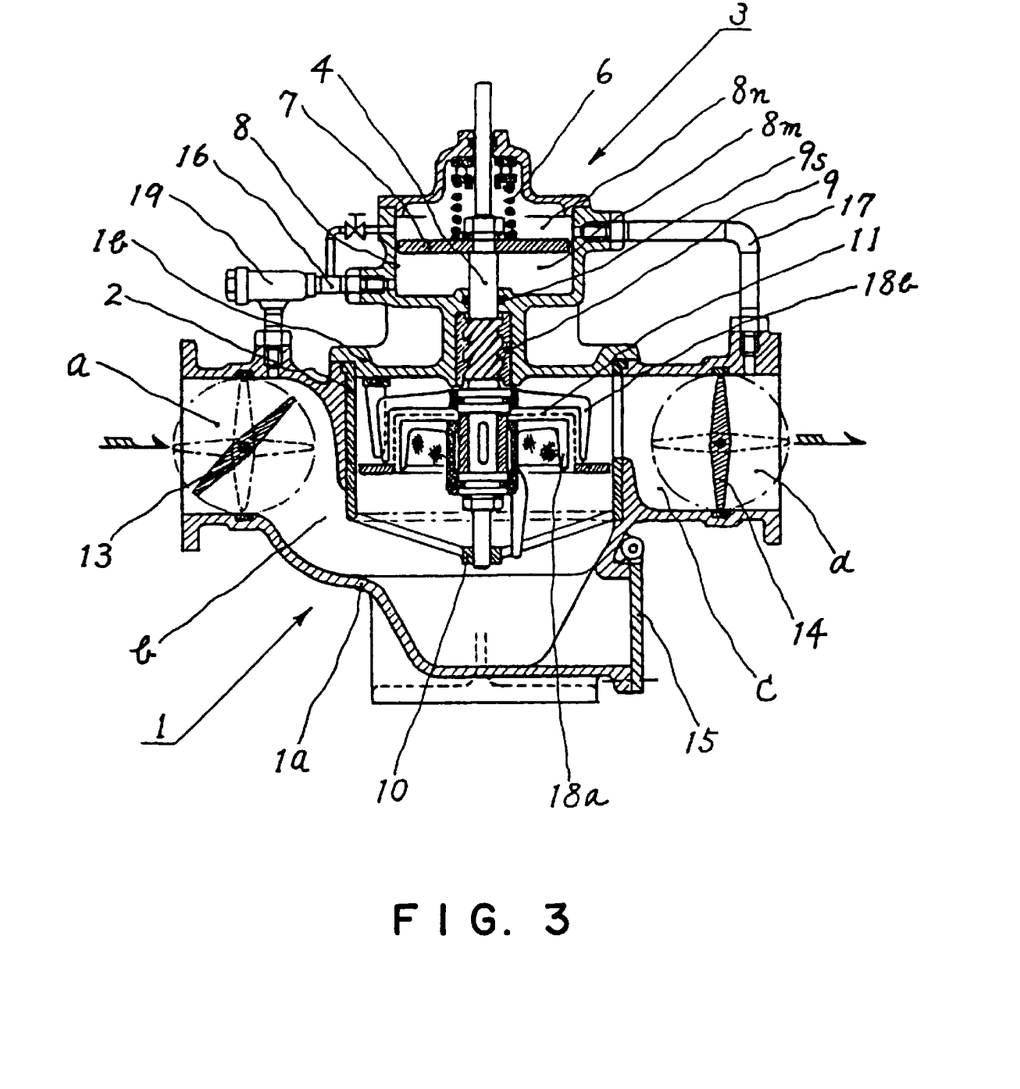
FIG. 3 is a longitudinal sectional view of a self-gush-cleaning filter device in a third embodiment according to the present invention in a state where a screen has been moved to a limit downstream position.

FIG. 3 shows a self-gush-cleaning filter device in a third embodiment according to the present invention. This self-gush-cleaning filter device is not provided with any mechanism corresponding to the wiper cam mechanism for biasing the drive shaft 4 in the upstream direction included in the screen driving unit 3 of the self-gush-cleaning filter device in the first embodiment shown in FIG. 1, but the self-gush-cleaning filter device is provided with a biasing member 6 for biasing a drive shaft 4 for driving a screen 11 in the upstream direction, and produces a high force for pushing the drive shaft 4 in the downstream direction in a cylinder 8. A piston 7 is mounted on the drive shaft 4 and fitted loosely in the cylinder 8. A chamber 8m to which a pressure is applied to push the drive shaft 4 in the downstream direction is connected via a connecting passage 16 to a passage downstream of an inlet shutoff valve 13, and a chamber 8n to which a pressure is applied to push the drive shaft 4 in the upstream direction is connected via a connecting passage 17 to a passage downstream of an outlet shutoff valve 14.

When removing foreign matters from the screen 11, the outlet shutoff valve 14 is closed so that the pressure in the outlet passage d extending downstream from the outlet shutoff valve 14 prevails in the chamber 8n, and then the inlet shutoff valve 13 is closed and opened alternately to drive the screen 11. When the inlet shutoff valve 13 is closed, the chamber 8m is disconnected from the inlet passage a through which a pressure is applied to the chamber 8m, so that the piston 7 under the biasing force of the biasing member 6 is moved slowly in the upstream direction as the fluid in the chamber 8m is allowed to flow through a small gap between the piston 7 and the cylinder 8. Finally the pressure working in the chamber 8m is balanced with that working in the chamber 8n and the screen 11 is held at a limit upstream position. When the inlet shutoff valve 13 is opened thereafter, the pressure working in the chamber 8m increases instantly to the pressure working in the inlet passage a, and the drive shaft 4 is pushed quickly in the downstream direction against the composite force of the pressure working in the chamber 8n and the biasing force of the biasing member 6. Thus, a screen driving function similar to that of the screen driving unit shown in FIG. 1 can be exercised. Other particulars of the operating mode of the self-gush-cleaning filter device are the same as those of the operating mode of the self-gush-cleaning filter device shown in FIG. 1 and hence the description thereof will be omitted.

In the embodiment shown in FIG. 3, it is desirable to place a small strainer 19 in the connecting passage 16 because a small amount of the fluid leaks from the inlet passage a through the connecting passages 16 and 17 into the outlet passage d.

An example of scraping members 18a and 18b for scraping foreign matters off the screen 11 is shown in FIG. 3. The drive shaft 4 has a threaded portion provided with a thread of a great pitch and screwed in a bearing 9. When the drive shaft 4 is moved axially by the operating force of the screen driving unit 3, the drive shaft 4 rotates together with the screen 11 fastened to the drive shaft 4. The scraping members 18a and 18b are rotatably fitted on the drive shaft 4 so as to be able to rotate relative to the drive shaft 4. Further, the scraping members 18a and 18b are disposed in sliding contact with the surfaces of the screen 11 on the upstream and the downstream side, respectively, and are restrained from turning relative to a filter casing 1. The scraping members 18a and 18b move axially together with the screen 11. The shape, such as a shape resembling a plate, a shape resembling teeth or a shape resembling a brush, of the scraping members 18a and 18b are dependent on the type of the screen 11, such as a mesh type, a porous type or slit type. The scraping member 18a in contact with the upstream surface of the screen 11, i.e., the surface on which foreign matters deposit, scrapes the foreign matters off the screen 11, and the scraping member 18b in contact with the downstream surface of the screen 11, i.e., the surface opposite the surface on which foreign matters deposit, pushes foreign matters through the screen 11 toward the upstream side of the screen 11. The scraping members 18a and 18b may be provided with blades for converting the flow of the fluid into a torque which rotates the scraping members 18a and 18b in sliding contact with the screen 11. If only the cylindrical side wall of the screen 11 needs cleaning, scraping members, not shown, fixedly placed in the filter casing 1 may be employed.

Figure 4:
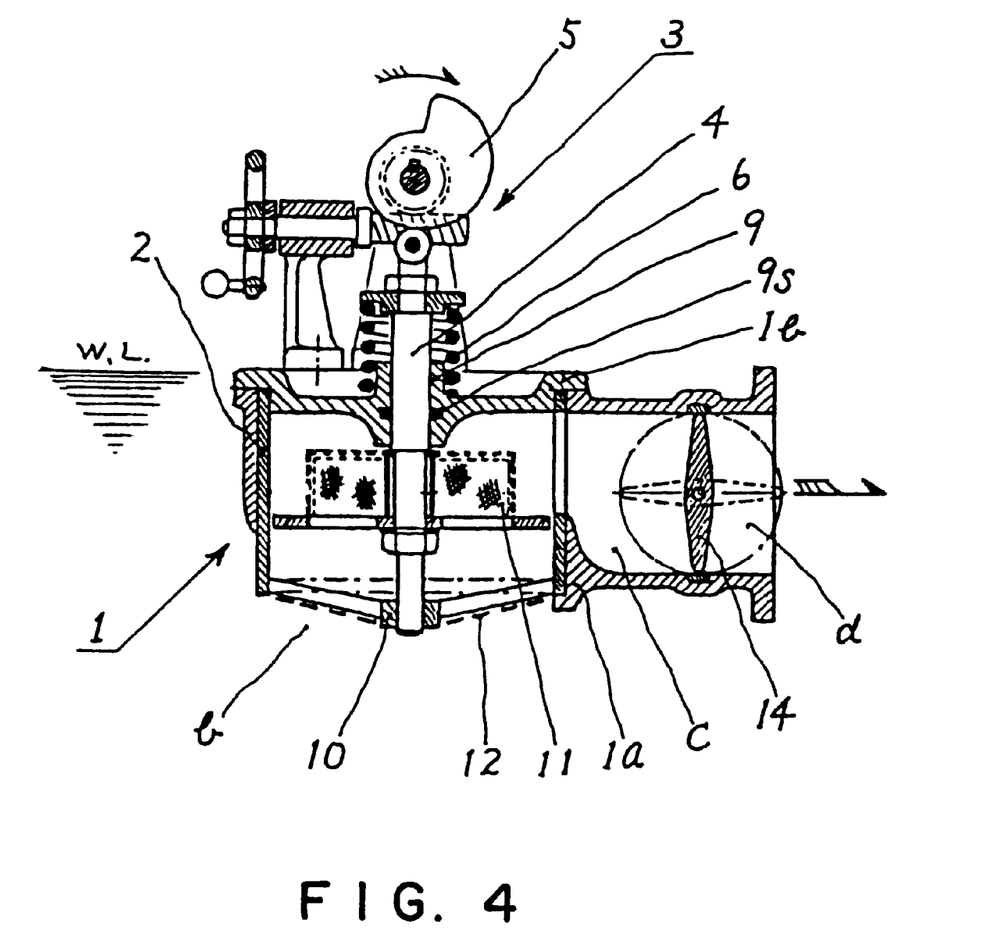
FIG. 4 is a longitudinal sectional view of a self-gush-cleaning filter device in a fourth embodiment according to the present invention in a state where a screen has been moved to a limit downstream position.

FIG. 4 shows a self-gush-cleaning filter device designed for use at a fluid inlet. The construction of this self-gush-cleaning filter device is similar to that of the self-gush-cleaning filter device shown in FIG. 1. As shown in FIG. 4, this self-gush-cleaning filter device is not provided with any valve corresponding to the inlet shutoff valve 13, and is provided with an inlet passage b extending upstream of a screen 11 and serving also as a foreign matter ejecting opening.

The movable components of the foregoing self-gush-cleaning filter devices of the present invention, such as the screen driving unit 3, the inlet shutoff valve 13, the outlet shutoff valve 14 and a cover closing the foreign matter ejecting opening 15, may be automatically operated by actuators. The operations of those actuators may be controlled in an automatic sequential control mode, i.e., an unmanned control mode to carry out automatically a series of operations including a foreign matter removing operation, a foreign matter ejecting operation and a filtering condition setting operation.

Figure 5:
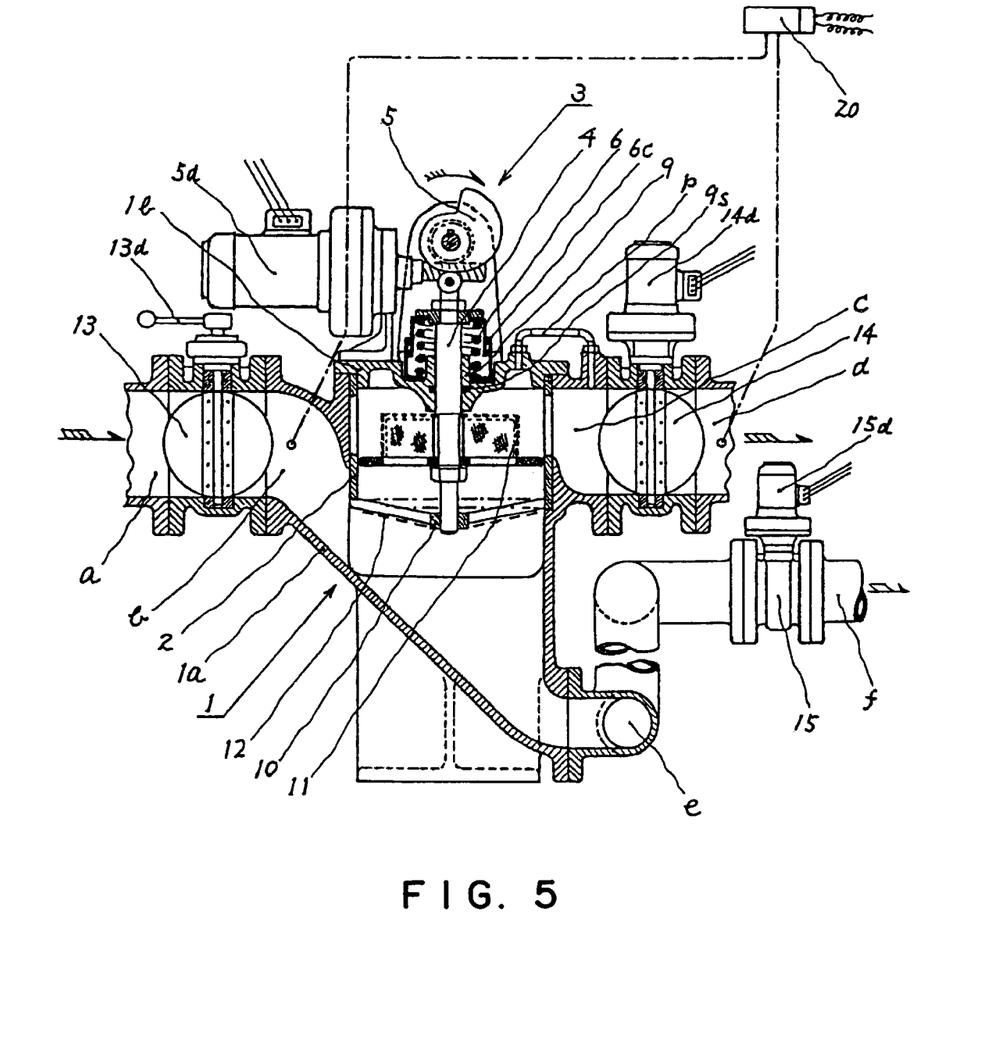
FIG. 5 is a longitudinal sectional view partly in a front view of a self-gush-cleaning filter device in a fifth embodiment according to the present invention in a state where a screen has been moved to a limit downstream position.

FIG. 5 shows a self-gush-cleaning filter device in a fifth embodiment according to the present invention, capable of being operated in an unmanned control mode. The self-gush-cleaning filter device is provided with a differential pressure measuring device 20 capable of measuring the differential pressure between the opposite sides of a screen 11 resulting from the resistance of foreign matters deposited on the screen 11 against the flow of a fluid or a position transducing device, not shown, capable of sensing the variation of the position of the screen 11 on the basis of the differential pressure. The differential pressure measuring device 20 and the position transducing device may be well-known ones and hence the description thereof will be omitted. The self-gush-cleaning filter device exercises a sequential control function to operate sequentially actuators 5d, 14d and 15d for operating a screen driving unit 3, an outlet shutoff valve 14 and a foreign matter ejecting opening 15 to achieve an automatic sequential control operation.

An automatic sequential control comprises, by way of example, closing the outlet shutoff valve 14 to disconnect a passage downstream of the screen 11 when a differential pressure signal indicates the deposition of an excessive amount of foreign matters on the screen 11, actuating the screen driving unit 3 to blow the foreign matters deposited on the upstream surface of the screen 11 off the screen 11 by the force of the gushing fluid by moving the screen slowly in the upstream direction and moving the same quickly in the downstream direction, and opening the foreign matter ejecting opening 15 to eject the foreign matters removed from the screen 11 (an inlet shutoff valve 13 may be kept either open or closed as mentioned above). Thereafter, the foreign matter ejecting opening 15 is closed, and the outlet shutoff valve 14 is opened to set the self-gush-cleaning filter device for a filtering process.

Although the inlet shutoff valve 13 included in the fifth embodiment as illustrated in FIG. 5 is operated by manually operating a handle 13d, naturally, the inlet shutoff valve 13 may be automatically operated.

A case 6c for containing a biasing member 6 as shown in FIG. 5 is a telescopic structure consisting of two tubes one nested in the other and capable of extending in a predetermined range. The sufficiently compressed biasing member 6 is contained in the case 6c to facilitate the installation, inspection and replacement of the biasing member 6. The self-gush-cleaning filter device shown in FIG. 5 is provided with a connecting passage p to allow a gas, such as air, accumulated in an upper portion of a filter casing 1 included in the self-gush-cleaning filter device to escape downstream. If a gas accumulates in an upper portion of the filter casing 1, it is possible, when the self-gush-cleaning filter device is used for filtering a liquid, that the screen driving unit 3 is unable to make the liquid gush out satisfactorily. Therefore, the gas must be made to escape from the filter casing 1. A differential pressure produced by slightly narrowing a passage by a partition member 2 is used to conduct the gas accumulated in an upper portion of the filter casing 1 in the downstream direction.

As is apparent from the foregoing description, although the self-gush-cleaning filter devices of the present invention exercise epoch-making effects, many changes and variations may be made in and conventional techniques may be incorporated into the foregoing self-gush-cleaning filter devices of the present invention to meet requests for the practical operation of the self-gush-cleaning filter devices.

For example, although the inlet shutoff valve 13 and the outlet shutoff valve 14 in each of the embodiments illustrated in FIGS. 1 to 5 take the shape of a butterfly valve, the shutoff valves 13 and 14 may be valves of any type, such as gate valves, globe valves, ball valves or lift valves, provided that the shutoff valves 13 and 14 are able to shut off the corresponding passages. The foreign matter ejecting opening 15 may be provided with a valve of any suitable type.

Naturally, the biasing member 6 may be any suitable member other than an elastic member, such as shown in FIGS. 1, 3, 4 and 5, such as a combination of a weight and a linkage, a power-assisted biasing member, a pneumatic biasing device or a hydraulic biasing device.

Naturally, the self-gush-cleaning filter device of the present invention may be provided with either only a single screen as shown in FIG. 3 or a plurality of screens. Each of the self-gush-cleaning filter devices of the present invention shown in FIGS. 1, 2, 4 and 5 is provided with the screen 11 of a relatively fine mesh, and a screen 12 of a relatively coarse mesh disposed on the upstream side of the screen 11. Foreign matters removed from the fine screen 11 by the action of the gushing fluid drop by gravity, pass the coarse screen 12, and collect together with coarse foreign matters removed from the coarse screen 12 on the bottom of the filter casing 1. The coarse screen 12 may be fixedly disposed in the filter casing 1 as shown in FIGS. 1, 2, 4 and 5 or may be mounted, similarly to the fine screen 11, on the drive shaft 4 so as to move together with the drive shaft 4.

The screens 11 and 12 may be made of any suitable material, such as a metal, a synthetic resin, synthetic fibers or the like. It is desirable to form the screens 11 and 12 of a somewhat elastic material because the meshes of a screen formed of somewhat elastic material are expanded by the gushing fluid to facilitate the separation of foreign matters caught in the meshes. The screens 11 and 12 may be formed of an inelastic material. A suitable material for forming the screens 11 and 12 is determined selectively taking into consideration the necessary strength and the screening performance of the screens.

It is desirable to form the bottom wall of the filter casing 1 so that the main passage extends apart from the foreign matters removed from the filters 11 and 12 by the gushing fluid and deposited on the bottom of the filter casing 1 to prevent the foreign matters deposited on the bottom of the filter casing 1 from being raised by the flow of the fluid and to prevent the foreign matters from depositing again on the screens 11 and 12. It is desirable to form the passage so that the fluid generally flows in a direction opposite the acting direction of gravity, i.e., upward. The partition member 2 may be formed integrally with the filter body 11a if the material forming the filter body 1a permits.

If the foreign matters removed from the screens by the gushing fluid need to be raised for ejection, the foreign matters may be carried by a mechanical conveying method using buckets or a conveyor, by a pump or by the flow and pressure of the fluid flowing through the inlet passage a. In case of using a fluid the ability of the fluid to raise the foreign matters is dependent on conduit conditions including the flow rate and the pressure of the fluid. If the conduit conditions permit, the self-gush-cleaning filter device of the present invention may be installed in an underground pit and the foreign matter ejecting opening and foreign matter discharge passages e through f may be installed on the ground. If the flow rate and the pressure of the fluid are excessively high, the force of the foreign matter discharge may be properly suppressed by adjusting the opening of the inlet shutoff valve 13.

The positional relation between the components of the self-gush-cleaning filter device of the present invention and the like may be changed within the scope of the present invention, and the present invention is not limited in its practical application to the foregoing embodiments.

INDUSTRIAL APPLICABILITY

As is apparent from the foregoing description, the present invention is based on a new technical idea of removing foreign matters deposited on a screen from the screen by the force of a gushing fluid caused to gush mainly by varying the volume of a closed space containing the fluid, the self-gushcleaning filter device of the present invention has a simple, lucid construction and is capable of drastically solving the technical problems in cleaning the clogged screen of the prior art filter device. The self-gush-cleaning filter device of the present invention enables the easy removal of foreign matters from the screen and ejection of the removed foreign matters by either a manual operation or an automatic operation using actuators. The self-gush-cleaning filter device of the present invention can be constructed in a large scale without entailing any problem, is economically advantageous and is capable of exercising high performance. Thus, the self-gush-cleaning filter device of the present invention provides advantages in design, manufacture and maintenance control and have a great effect as compared with that of the prior art.

What is claimed is:

1. A self-gush-cleaning filter device comprising:
   a filter casing provided with an inlet passage and an outlet passage;
   a screen disposed within the filter casing so as to slide along an inner surface of the filter casing in a direction of flow of a fluid;
   a foreign matter ejecting opening means formed between the screen and the inlet passage;
   a drive shaft for driving the screen;
   a screen driving unit for driving the drive shaft so as to move the screen quickly in a downstream direction in which the fluid flows from the inlet passage toward the outlet passage and to move the screen slowly in an upstream direction opposite the downstream direction; and
   an outlet shutoff valve disposed in said outlet passage;
   wherein said screen driving unit comprises:
   a wiper cam mechanism for pushing the drive shaft in the upstream direction;
   a piston mounted on the drive shaft; and
   a cylinder hermetically receiving the piston therein and having a first chamber communicating with the inlet passage, for pushing the drive shaft in the downstream direction, and a second chamber located opposite said first chamber and communicating with the atmosphere.

2. A self-gush-cleaning filter device comprising a filter casing provided with an inlet passage and an outlet passage;
   a screen disposed within the filter casing so as to slide within an inner surface of the filter casing in a direction of flow of a fluid;
   a foreign matter ejecting opening means formed between the screen and the inlet passage;
   a drive shaft for driving the screen;
   a screen driving unit for driving the drive shaft so as to move the screen quickly in a downstream direction in which the fluid flows from the inlet passage toward the outlet passage and to move the screen slowly in an upstream direction opposite the downstream direction; and
   an outlet shutoff valve disposed in said outlet passage;
   wherein said inlet passage has an inlet shutoff valve therein; and
   said screen driving unit comprises:
   a coil spring coaxially mounted around said drive shaft and exerting a constant biasing force to constantly bias the drive shaft in the upstream direction;
   a piston mounted on the drive shaft; and
   a cylinder slidably receiving the piston therein and having a first chamber communicating with a space on a downstream side of the inlet shutoff valve, for pushing the drive shaft in the downstream direction, and a second chamber communicating with a space on a downstream side of the outlet shutoff valve, for pushing the drive shaft in the upstream direction; and
   wherein said screen has an upstream side surface and a downstream side surface, and a scraping member is disposed in sliding contact with at least one of the upstream and downstream side surfaces of the screen.

3. The self-gush-cleaning filter device according to claim 1, wherein said screen has an upstream side surface and a downstream side surface, and a scraping member is disposed in sliding contact with at least one of the upstream and downstream side surfaces of the screen.

4. The self-gush-cleaning filter device according to claim 1, wherein at least one of the screen driving unit, the outlet shutoff valve and the foreign matter ejecting opening means has an actuator for automatic operation thereof.

5. The self-gush-cleaning filter device according to claim 3, wherein at least one of the screen driving unit, the outlet shutoff valve and the foreign matter ejecting opening means has an actuator for automatic operation thereof.

6. The self-gush-cleaning filter device according to claim 2, wherein at least one of the screen driving unit, the outlet shutoff valve, the inlet shutoff valve and the foreign matter ejecting opening means has an actuator for automatic operation thereof.

7. The self-gush-cleaning filter device according to claim 4, further comprising means connected to said actuator for operating the actuator in response to a positional signal representing a position of the screen, to carry out an automatic operation in a predetermined sequence.

8. The self-gush-cleaning filter device according to claim 4, further comprising means connected to said actuator for operating the actuator in response to a differential pressure signal representing a differential pressure between an upstream side of the screen and a downstream side of the screen, to carry out an automatic operation in a predetermined sequence.

9. The self-gush-cleaning filter device according to claim 5, further comprising means connected to said actuator for operating the actuator in response to a positional signal representing a position of the screen, to carry out an automatic operation in a predetermined sequence.

10. The self-gush-cleaning filter device according to claim 5, further comprising means connected to said actuator for operating the actuator in response to a differential pressure signal representing a differential pressure between the upstream side of the screen and the downstream side of the screen, to carry out an automatic operation in a predetermined sequence.

11. The self-gush-cleaning filter device according to claim 6, further comprising means connected to said actuator for operating the actuator in response to a positional signal representing a position of the screen, to carry out an automatic operation in a predetermined sequence.

12. The self-gush-cleaning filter device according to claim 6, further comprising means connected to said actuator for operating the actuator in response to a differential pressure signal representing a differential pressure between the upstream side of the screen and the downstream side of the screen, to carry out an automatic operation in a predetermined sequence.

* * * * *